US008428259B2

(12) United States Patent
Waters

(10) Patent No.: US 8,428,259 B2
(45) Date of Patent: Apr. 23, 2013

(54) APPARATUS AND METHOD FOR ALL-OPTICAL ENCRYPTION AND DECRYPTION OF AN OPTICAL SIGNAL

(75) Inventor: James P. Waters, Boonton Township, NJ (US)

(73) Assignee: General Dynamics Advanced Information Systems, Fairfax, VA (US)

( * ) Notice: Subject to any disclaimer, the term of this patent is extended or adjusted under 35 U.S.C. 154(b) by 1525 days.

(21) Appl. No.: 11/148,318

(22) Filed: Jun. 9, 2005

(65) Prior Publication Data

US 2006/0280304 A1 Dec. 14, 2006

(51) Int. Cl.
*H04L 29/06* (2006.01)

(52) U.S. Cl.
USPC ........... 380/256; 380/200; 380/255; 708/801; 356/491

(58) Field of Classification Search .................... 380/21, 380/40, 41, 252–257; 713/182–194, 200–202; 359/298–304, 173, 183, 154, 156, 158, 161, 359/127, 130, 188, 290; 356/477, 491; 375/111, 375/110, 87, 94–96, 106, 119; 328/38.1, 328/55; 307/605; 385/15, 24, 37, 42, 122, 385/142, 129, 130, 131, 141, 139, 132, 143; 398/141; 65/385, 386
See application file for complete search history.

(56) References Cited

U.S. PATENT DOCUMENTS 2,405,500 A 8/1946 Guanella
2,964,619 A 12/1960 Hahn et al.
3,519,322 A 7/1970 Brooks et al.
5,140,636 A 8/1992 Albares
5,307,410 A 4/1994 Bennett (Continued)

OTHER PUBLICATIONS

Chan et al., "Architectures and Technologies for High Speed Optical Data Networks;" Journal of Lightwave Technology, vol. 16, No. 12 (Dec. 1998), pp. 2146-2148.*

(Continued)

*Primary Examiner* — Taghi Arani
*Assistant Examiner* — Narciso Victoria
(74) *Attorney, Agent, or Firm* — Ingrassia Fisher & Lorenz, P.C.

(57) ABSTRACT

The present invention relates to an apparatus and method for the encryption and decryption of optically transmitted data, and more particularly to the encryption and decryption of optical data transmitted and received using only optical components. Because only optical components are used, the encryption and decryption is independent of the data rate of the optical signal. The apparatus may include an encryption device that operates by receiving and combining both an unencrypted optical signal as well as a delayed optical signal that is based on the unencrypted optical signal. An optical delay may be configured in a number of different ways and may be used for delaying the unencrypted optical signal. The apparatus may further include a decryption device that receives and combines an encrypted optical signal as well as a delayed optical signal that is based on the encrypted optical signal. An optical delay may be configured in a number of different ways and may be used for delaying the encrypted optical signal. To properly work together, the apparatus and method require that the optical delay on the encryption side perfectly match the optical delay on the decryption side in both the length of delay and arrangement.

39 Claims, 8 Drawing Sheets

U.S. PATENT DOCUMENTS

| | | | | |
|---|---|---|---|---|
| 5,515,438 | A | 5/1996 | Bennett et al. | |
| 5,568,301 | A | 10/1996 | Tiemann et al. | |
| 5,675,648 | A | 10/1997 | Townsend | |
| 5,757,912 | A | 5/1998 | Blow | |
| 5,793,871 | A | 8/1998 | Jackson | |
| 5,850,441 | A | 12/1998 | Townsend et al. | |
| 5,864,625 | A | 1/1999 | Rutledge | |
| 5,903,648 | A | 5/1999 | Javidi | |
| 5,953,421 | A | 9/1999 | Townsend | |
| 5,999,285 | A | 12/1999 | Brandt et al. | |
| 6,002,773 | A | 12/1999 | Javidi | |
| 6,028,935 | A | 2/2000 | Rarity et al. | |
| 6,594,055 | B2 * | 7/2003 | Snawerdt | 398/141 |
| 6,810,407 | B1 * | 10/2004 | Jaques et al. | 708/801 |
| 7,043,133 | B2 * | 5/2006 | Johnson et al. | 385/142 |
| 7,236,595 | B1 * | 6/2007 | Bean et al. | 380/256 |
| 7,720,226 | B2 * | 5/2010 | Turpin | 380/256 |
| 2004/0264695 | A1 * | 12/2004 | Turpin | 380/200 |

OTHER PUBLICATIONS

Fred F. Froehlich et al. "All-Optical Encryption for Links at 10 GBPS and Above." Military Communications Conference, 2005. MILCOM 2005. IEEE.*

PCT International Search Report mailed Nov. 13, 2006.

Article entitled "Optical Encryption for High-Bit Rate Systems Using Fiber Bragg Gratings," by P. Torres et al, Microwave and Optoelectronics Conference, 1999. SMBO/IEEE MTT-S, APS and LEOS—IMOS '99. International Aug. 9-12, 1999, Piscataway, NJ, USA, IEEE, vol. 1, Aug. 9, 1999, pp. 83-85, XP010510958, ISBN: 0-7803-5807-4.

Chan et al., "Architectures and Technologies for High-Speed Optical Data Networks;" Journal of Lightwave Technology, vol. 16, No. 12 (Dec. 1998), pp. 2146-2148.

Schneier, B., Applied Cryptography, New York, John Wiley & Sons (1996), p. 14.

* cited by examiner

Figure 7

Encryption

| | |
|---|---|
| Unencrypted Signal | 110100111010000111010111001011100 |
| Delayed Signal | 110010101111111000010101100111 |
| Encrypted Signal | 110010101111111000010101100111011 |

Decryption

| | |
|---|---|
| Encrypted Signal | 110010101111111000010101100111011 |
| Delayed Encr. Signal | 110111001101010000111111101010011 |
| Decrypted Signal | 110100111010000111010111001011100 |

TIME →

APPARATUS AND METHOD FOR ALL-OPTICAL ENCRYPTION AND DECRYPTION OF AN OPTICAL SIGNAL

FIELD OF THE INVENTION

The present invention relates to the field of encryption and decryption of optically transmitted data, and more particularly to the encryption and decryption of optical data using optical components without the need for conversion of the optical signal to an electrical signal to perform encryption/decryption processes

BACKGROUND OF THE INVENTION

Encryption and decryption of transmitted data is necessary to ensure privacy against eavesdropping and to provide security against unwanted interception of the transmitted data. In the field of cryptography, data may be encrypted using mathematical algorithms such as DES (Data Encryption Standard), RSA (Rivest, Shamir, and Adleman) and DSA (Digital Signature Algorithm). Current technology may implement these algorithms using computers or specialized electronic circuitry. Once the data is encrypted, the information may be sent via wires, microwaves or fiber optics. However, the entire encryption process is dependent upon the data rate of the algorithms and the electronics used to implement the algorithms.

A major portion of the telecommunications industry is moving towards high data rate Dense Wavelength Division Multiplexing ("DWDM") systems for transmitting large amounts of data over fiber optic transmission lines. DWDM systems give telecommunications providers the ability to provide multiple services on a single optical channel. This may be accomplished by transmitting many wavelengths of light simultaneously over a single optical channel. Multiple optical signals may be combined, amplified as a group and transmitted. Current systems are capable of concurrently transmitting more than 150 different wavelengths of light and have demonstrated a 640 Gigabit per second ("Gb/s") DWDM test bed operating over 7,000 km of fiber using a 64-wavelength system operating at 10 Gb/s per channel. Ultra high-speed systems operating in excess of 20 Gb/s per channel are predicted for the near future. The current electronic encryption solutions are unable to cost-effectively encrypt data at these levels. In order to perform encryption and decryption at these data transmission speeds, the encryption and decryption must be performed directly on the optical data without the need for intervening electronics that would slow the process down. By performing the encryption and decryption directly on the optical data, the process becomes virtually independent of data rate.

SUMMARY OF THE INVENTION

The present invention relates to the field of encryption and decryption of optically transmitted data. More particularly, the invention relates to the encryption and decryption of optical data transmitted and received using optical components.

According to one exemplary embodiment, a method for transmitting an optical signal may include: receiving an unencrypted optical signal, delaying the unencrypted optical signal and encrypting the unencrypted optical signal. Encryption may further include interfering at least a portion of the unencrypted optical signal with a delayed optical signal, the delayed optical signal being that is based on the unencrypted optical signal and transmitting an encrypted optical signal. According to one embodiment, the method may also include receiving the encrypted optical signal, delaying the encrypted optical signal and decrypting the encrypted optical signal. Decryption may further include interfering at least a portion of the encrypted optical signal with a delayed optical signal that is based on the encrypted optical signal.

According to another exemplary embodiment, an apparatus for optical encryption may include an optical delay, an encryption device and an optical coupler. The encryption device may be configured to receive an unencrypted signal, and from the optical delay, a delayed optical signal that is based on the unencrypted optical signal and may further be configured to output an optical signal that is based on the unencrypted optical signal. The optical coupler may be configured to receive the optical signal that is based on the unencrypted optical signal and may further be configured to output both a portion of the optical signal that is based on the unencrypted optical signal to the optical delay and a portion of the optical signal that is based on the unencrypted optical signal as an encrypted signal.

According to another exemplary embodiment, an apparatus for optical decryption may include an optical delay, a decryption device and an optical coupler. The optical coupler may be configured to receive an encrypted optical signal and may further be configured to output two portions of the encrypted optical signal. The optical delay may be configured to receive one of the portions of the encrypted optical signal. The decryption device may be configured to receive one of the portions of the encrypted optical signal in addition to a delayed optical signal that is based on the encrypted optical signal from the optical delay and may further be configured to output a decrypted optical signal.

According to another exemplary embodiment, a system for optical transmission may include first and second optical delays, first and second optical couplers, an encryption device, a decryption device and a transmission line. The encryption device may be configured to receive, from the first optical delay, an unencrypted optical signal and a delayed optical signal that is based on an unencrypted optical signal and may further be configured to output an optical signal that is based on the unencrypted optical signal. The first optical coupler may be configured to receive the optical signal that is based on the unencrypted optical signal and may further be configured to output both a portion of the optical signal that is based on the unencrypted optical signal to the first optical delay and a portion of the optical signal that is based on the unencrypted optical signal as an encrypted signal. The transmission line may be configured to receive the encrypted optical signal from the first optical coupler. The second optical coupler may be configured to receive the encrypted optical signal from the transmission line and may further be configured to output two portions of the encrypted optical signal. The second optical delay may be configured to receive one of the portions of the encrypted optical signal. The decryption device may also be configured to receive one of the portions of the encrypted optical signal in addition to a delayed optical signal that is based on the encrypted optical signal from the second optical delay and may further be configured to output a decrypted optical signal.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 7 shows the conceptual encryption and decryption of a signal according to the exemplary embodiment shown in FIG. 6.

DETAILED DESCRIPTION OF THE INVENTION

The present disclosure will now be described more fully with reference to the Figures in which various embodiments of the present invention are shown. The subject matter of this disclosure may, however, be embodied in many different forms and should not be construed as being limited to the embodiments set forth herein.

Figure 1:
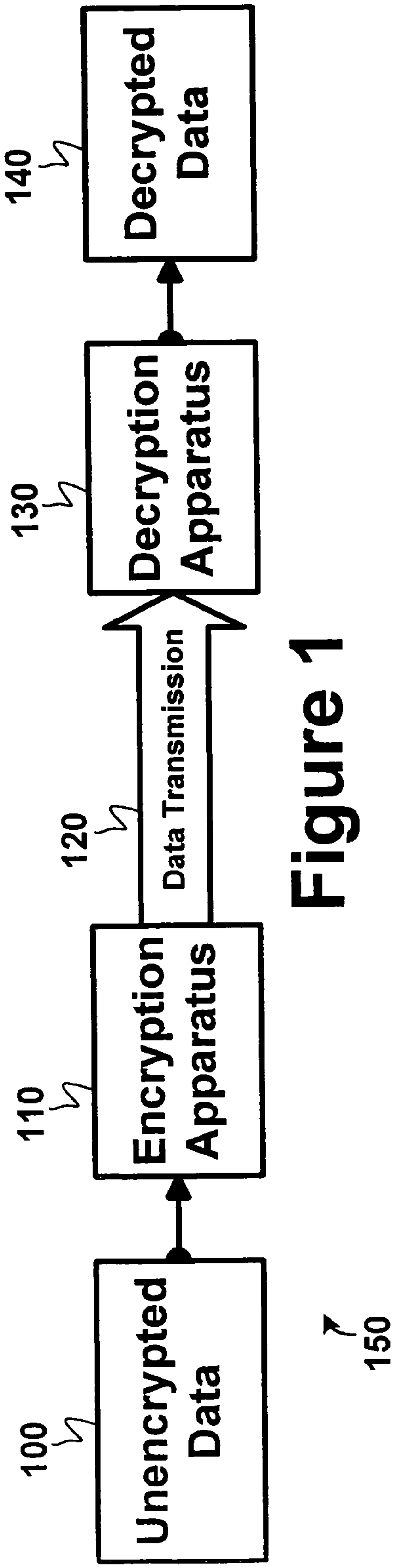
FIG. 1 shows a functional block diagram of a system configured for transmitting and receiving encrypted data according to an embodiment of the present invention.

FIG. 1 shows a functional block diagram of a system 150 configured for transmitting and receiving encrypted optical data according to various embodiments of the present invention. According to an exemplary embodiment of the invention, unencrypted optical data 100 to be transmitted may be encrypted prior to the transmission. The unencrypted data may be in the form of, for example, voice data, image data and text data. The data may be arranged in packets for transmission to a receiver. Of course, any type of data may be embodied in an optical signal, and therefore, the particular type of data being transmitted is in no way intended to limit the present invention.

As illustrated in FIG. 1, an encryption apparatus 110 may receive the unencrypted optical data 100 from a data source (not shown) and may perform an encryption process to encrypt the unencrypted optical data. The encryption apparatus 110 may be connected to a transmission line 120. This transmission line 120 may be configured to transmit the encrypted optical data. According to another exemplary embodiment of the invention, the encryption apparatus 110 may transmit the encrypted optical data to an optical component such as a circulator, coupler, switch or various other types of optical routing devices (not shown). It should be noted that, in one embodiment of the present invention, the transmission of optical data between optical components may be performed using single-mode optical fibers. However, mirrors and other various means for transmitting optical data between optical components may also be used.

The encryption process performed by the encryption apparatus 110 may be performed on any type of optical data, independent of the data rate, bandwidth and protocol of the data to be transmitted. Additionally, the encryption apparatus 110 and the transmission line 120 may be incorporated into a telephone network, a television network, a secure network, a local network, the World Wide Web and other types of information-sharing systems.

A decryption apparatus 130 may be connected to the receiving end of the transmission line 120. The term receiving end is merely a frame of reference made with respect to the direction of travel of a single bit of data, and is not intended to be limiting. Of course, bidirectional transmission systems may be employed in connection with the present invention. The decryption apparatus 130 may directly receive the encrypted optical data from the transmission line 120. Alternatively, the data may be fed to the decryption apparatus 130 via one or more optical components such as a circulator, coupler, switch or various other types of optical routing devices (not shown). Upon receipt of encrypted data, the decryption apparatus 130 may perform a decryption process to decrypt the encrypted optical data. The resulting decrypted data 140 may then be routed to a receiver, a network and various other types of systems which are capable of receiving optical data (not shown).

As with the encryption process, the decryption process may also be performed by the decryption apparatus 130 on any type of optical data, independent of the data rate, bandwidth and protocol of the data to be transmitted. The decryption apparatus 130 may also be incorporated into a telephone network, a television network, a secure network, a local network, the World Wide Web and various other types of information-sharing systems.

Figure 2:
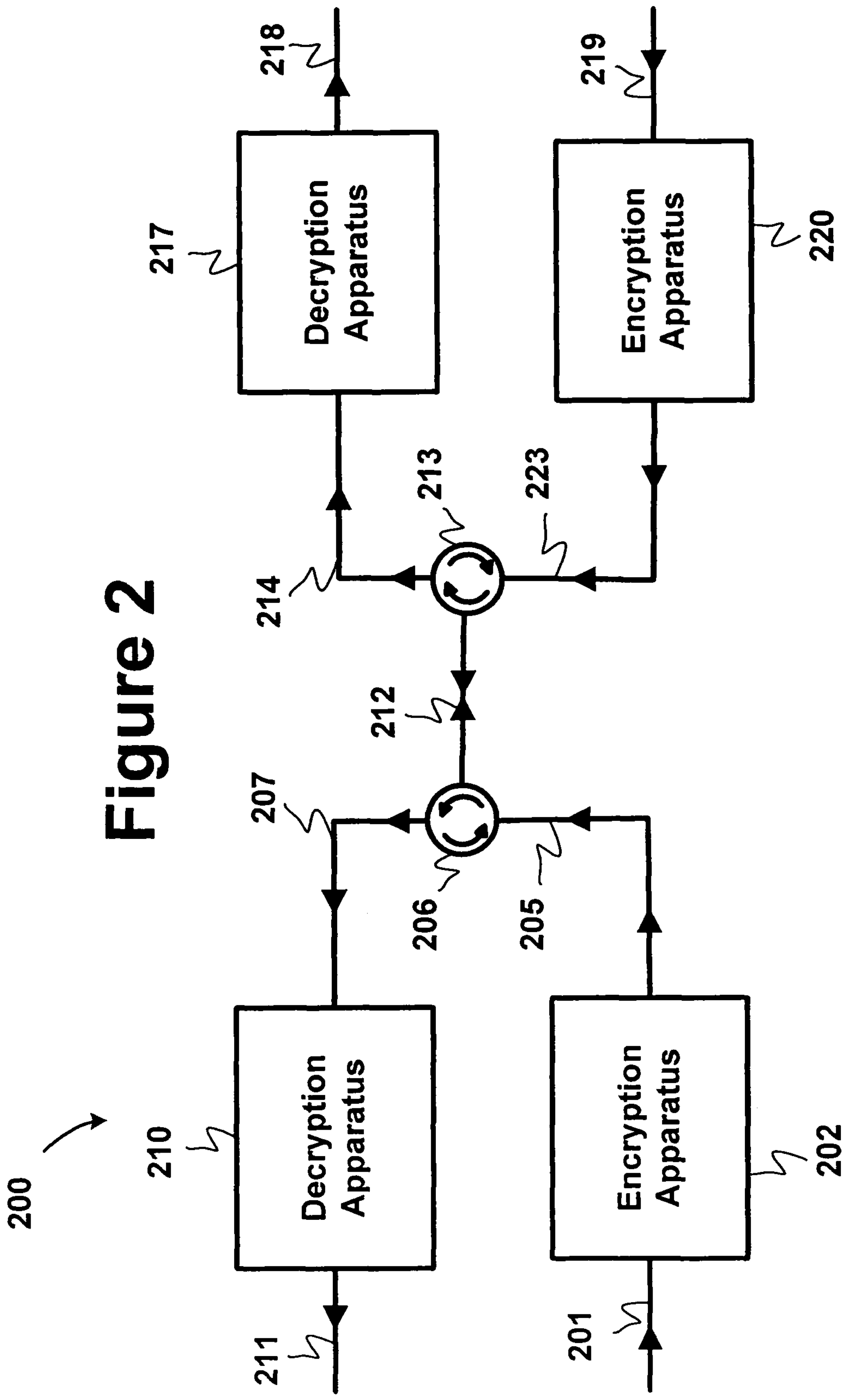
FIG. 2 shows a functional block diagram of an alternative system configured to encrypt and decrypt optical data according to an embodiment of the present invention.

While FIG. 1 shows a functional block diagram of a single, linearly constructed system for transmitting and receiving encrypted optical data, it will be readily apparent to one of skill in the art that a number of alternative embodiments are possible. For example, the transmission line may be configured to transmit optical data bidirectionally, as mentioned above, with both an encryption and a decryption apparatus disposed at both ends (as shown in FIG. 2). Additionally, multiple systems may be arranged so as to operate in parallel, utilizing a common transmission line. Further, several systems may be linked together so as to create a "chain" of systems for transmitting and receiving encrypted optical data. While specific embodiments of the invention have been set forth herein, these embodiments are not meant to be exhaustive as one of ordinary skill in the art would realize that many alternative configurations of the system are possible.

FIG. 2 shows a functional block diagram of a system 200 configured to encrypt and decrypt optical data according to various embodiments of the present invention. As illustrated in FIG. 2, both an encryption apparatus 202, 220 and a decryption apparatus 210, 217 may be disposed on either side of a transmission line 212. Combining an encryption apparatus 202, 220 and a decryption apparatus 210, 217 on each side of the transmission line 212 in this manner allows for secure, two-way communication between two or more end-stations. These end-stations may be transceiver stations, relay stations, or various other types of stations that may be configured to utilize optical communication.

The transmission line 212 may operate bidirectionally, allowing an optical signal to be transmitted in both directions, or may be a combination of two transmission lines coupled together. An optical signal 201, 219 to be encrypted may be received by the respective encryption apparatuses 202, 220 on either side of the transmission line 212. Likewise, an unencrypted optical signal 211, 218 may be output by the respective decryption apparatuses 210, 217. In one embodiment, an optical circulator 206, 213 may be disposed at either end of the transmission line 212 to direct optical signals to and from the encryption 202, 220 and decryption 210, 217 apparatuses. The optical circulator 206, 213 may direct optical signals 205, 223 into the transmission medium, shown in FIG. 2 as transmission line 212, and may direct received optical signals 207, 214 from the transmission 212 line to one of the decryption apparatuses 210, 217. In other embodiments, an optical switch, grating-based device, an optical bus or various other types of optical routing devices may be used in place of one or both of the optical circulators 206, 213.

Figure 3A:
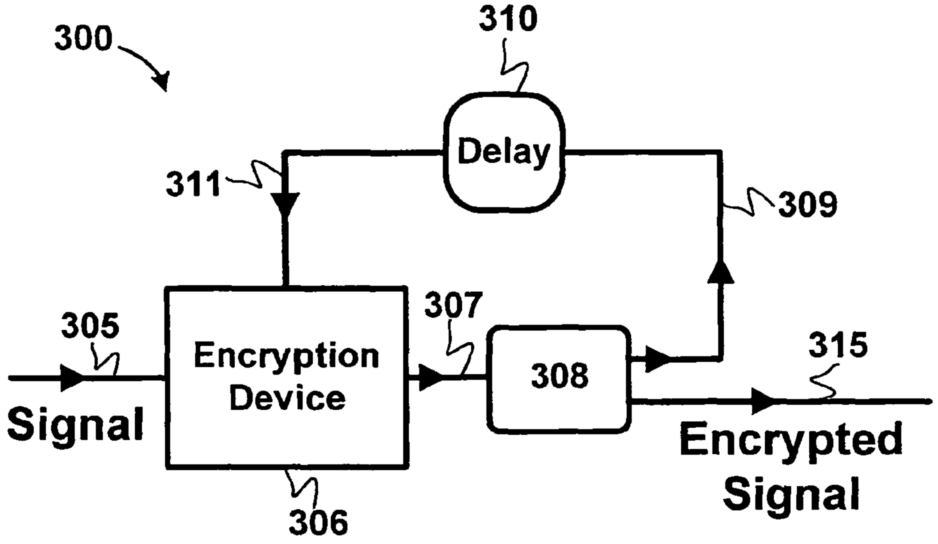
FIG. 3A shows a functional block diagram of an exemplary encryption apparatus configured to encrypt optical data according to an embodiment of the present invention.

FIG. 3A shows a functional block diagram of an exemplary encryption apparatus configured to encrypt optical data according to an embodiment of the present invention. The apparatus 300 may be employed, for example, as the encryption apparatus 110 shown in FIG. 1 or either of the encryption apparatuses 202, 220 shown in FIG. 2.

In one embodiment of the present invention, the encryption apparatus 300 may include an encryption device 306, an optical coupler 308 and an optical delay 310. During operation, the encryption apparatus 300 may receive an unencrypted optical signal 305 and may output an encrypted optical signal 315. The encryption device 306 may be configured to receive the unencrypted optical signal 305 and may further be configured to output an optical signal 307 that is based on the received unencrypted optical signal.

The optical coupler 308 may initially receive the optical signal that is based on the unencrypted optical signal 307 output by the encryption device, may divide the unencrypted optical signal that is based on the unencrypted optical signal 307 into multiple portions of the optical signal that is based on the unencrypted optical signal 309, 315 and may output each individual portion. One of the portions of the optical signal that is based on the unencrypted optical signal 315 output by the optical coupler 308 may be output from the encryption apparatus 300 as an unencrypted optical signal and the other portion of the optical signal that is based on the unencrypted optical signal 309 may be fed to the optical delay 310. In one embodiment, the optical signal may be divided equally by the optical coupler 308, with only a loss in the intensity of the optical signal. However, as will be readily apparent to one of skill in the art, the unencrypted optical signal may be divided according to any suitable ratio. It should be noted that, while the various optical components may cause some small changes to the optical signal, the binary signal (i.e. the data) will remain identical in both signals.

The portion of the optical signal that is based on the unencrypted optical signal 309, upon being output from the optical coupler 308, may be fed to the optical delay 310 where it may be delayed in time and output as a delayed optical signal that is based on the unencrypted optical signal 311. The optical delay 310 may consist of a fiber optic loop, a light pipe, mirrors or various other devices. The encryption device 306 may then receive the delayed optical signal that is based on the unencrypted optical signal 311 and may encrypt the unencrypted optical signal 305 currently being received. The encryption of the unencrypted optical signal 305 may be accomplished by combining the unencrypted optical signal 305 currently being received with the delayed optical signal 311 that is based on the previously received unencrypted optical signal. The encrypted optical signal may then be output to the optical coupler 308. The optical coupler may divide the encrypted optical signal and repeat the encryption process in the same manner as described above. Because the encryption device 306 operates by receiving an unencrypted optical signal 305 in addition to a delayed optical signal that is based on an unencrypted optical signal 311 previously output by the encryption device 306, the unencrypted optical signal 305 may be encrypted using only optical components.

Upon output from the optical coupler 308, the encrypted optical signal 315 may be transmitted over a transmission line, as described above with reference to FIGS. 1 and 2. Alternatively, the encryption apparatus 300 may transmit the encrypted optical signal to an optical component such as a circulator (as described above with reference to FIG. 2), a coupler, a switch or various other types of optical routing devices.

It should be noted that initially, the unencrypted optical signal 305 may pass through the encryption device 306 without being encrypted. As such, the transmitted encrypted optical signal 315 may be identical to the unencrypted optical signal 305 at the beginning of transmission. Therefore, the transmitted encrypted optical signal 315 may remain unchanged for a length of time equivalent to the amount of time it takes for an optical signal to travel through the optical delay 310 and reach the encryption device 306. However, once the delayed optical signal that is based on the unencrypted optical signal 311 reaches the encryption device, the output of the encryption device 306 may become encrypted and the transmitted optical signal 315 may be encrypted for the remaining length of the transmission. To account for this, a random header may be added to the unencrypted optical signal so that all of the information that is to be encrypted is actually transmitted as an encrypted optical signal. A random footer is not required because the encryption device 306 will perform the encryption process until an unencrypted optical signal 305 is no longer received. The random header may be predetermined by the system designer and does not need to be per se random. What is important to understand is that the information in the header does not necessarily impact the overall optical signal output from the encryption device, so it may be irrelevant what series of binary numbers are placed in the header.

Figure 3B:
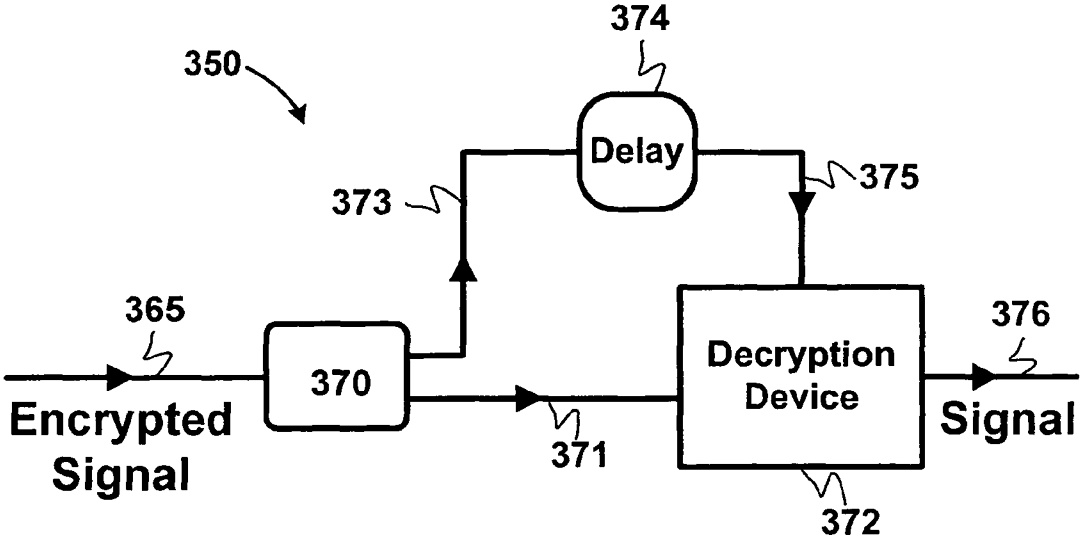
FIG. 3B shows a functional block diagram of an exemplary decryption apparatus configured to decrypt optical data according to an embodiment of the present invention.

FIG. 3B shows a functional block diagram of an exemplary decryption apparatus configured to decrypt optical data according to an embodiment of the present invention. The apparatus 350 may be used as the decryption apparatus 130 shown in FIG. 1 or either of the decryption apparatuses 210, 217 shown in FIG. 2. An encrypted optical signal 365 may be received and decrypted using a process that is an analog of the encryption process illustrated in FIG. 3A. In one embodiment, the decryption apparatus 350 may include an optical coupler 370, an optical delay 374 and a decryption device 372. The received encrypted optical signal 365 may be the same encrypted signal output by the encryption apparatus 300, illustrated in FIG. 3A. Once decryption is complete, the decryption apparatus may output an unencrypted optical signal 376 that may be identical to the unencrypted optical signal 305 received by the encryption apparatus 300, illustrated in FIG. 3A.

During operation, the optical coupler 370 may receive the encrypted optical signal 365 and may divide the optical signal into multiple portions of the encrypted optical signal 371, 373, outputting each portion separately. The decryption device 372 may be configured to receive one portion of the encrypted optical signal 371 and the optical delay 374 may be configured to receive the second portion of the encrypted optical signal 373. In one embodiment, the optical signal may be divided by the optical coupler 370, with only a loss in the intensity of the optical signal. However, the encrypted optical signal may be divided according to any suitable ratio. Again, it should be noted that, while the various optical components may cause some small changes to the optical signal, the binary signal (i.e. the data) will remain identical in both signals. The optical delay 374 may delay the second portion of the encrypted optical signal 373 in time and may output a delayed optical signal that is based on the encrypted optical signal 375 to the decryption device 372. The optical delay 374 may consist of a fiber optic loop, a light pipe, mirrors or various other devices.

The decryption device 372, upon receiving the first portion of the encrypted optical signal 371 and the delayed optical signal that is based on the encrypted optical signal 375, may perform a decryption operation on the encrypted optical signal 365 currently being received. The unencrypted optical signal 376 may then be realized by combining the first portion of the encrypted optical signal 371 with the delayed optical signal 375 that is based on the encrypted optical signal. The unencrypted optical signal 376 may then be routed to a receiver, a network and various other types of systems which are capable of receiving the data as will be readily apparent to one of skill in the art (not shown).

As discussed earlier, with reference to FIG. 3A, a portion of the unencrypted optical signal may remain unencrypted when it is transmitted. Likewise, an initial portion of the optical signal 365 received by the decryption apparatus 350 may pass through the decryption device 372 without being decrypted. If a header is added to the unencrypted optical signal prior to encryption and transmission, as discussed earlier, the header may also appear at the beginning of the decrypted signal and, therefore, all of the information previously encrypted will be decrypted; the header will be output, unaltered, prior to the output of the decrypted optical signal.

In order for the encryption apparatus shown in FIG. 3A to function with the decryption apparatus shown in FIG. 3B, the length of time of the optical delay 310 in the encryption apparatus 300 must be matched perfectly to the length of time of the optical delay 374 in the decryption apparatus 350. As will be seen below, the length of the delay is essential to the encryption and decryption processes. If the delays are matched perfectly, the optical bits in both the transmitted optical signal and the received optical signal will line up in time with their delayed versions.

Consider, for example, a system operating at 20 Gb/s with a practical delay limit of 1 km. If the encrypted signal is accidentally received or intercepted, there are 100,000 possibilities for the unencrypted signal because the interceptor does not know the number of bits received before the encrypted optical signal begins. Without the exact delay length, decryption may be time and labor intensive. Additionally, as the time of delay is increased, the number of possibilities for the unencrypted optical signal also increases.

Figure 4A:
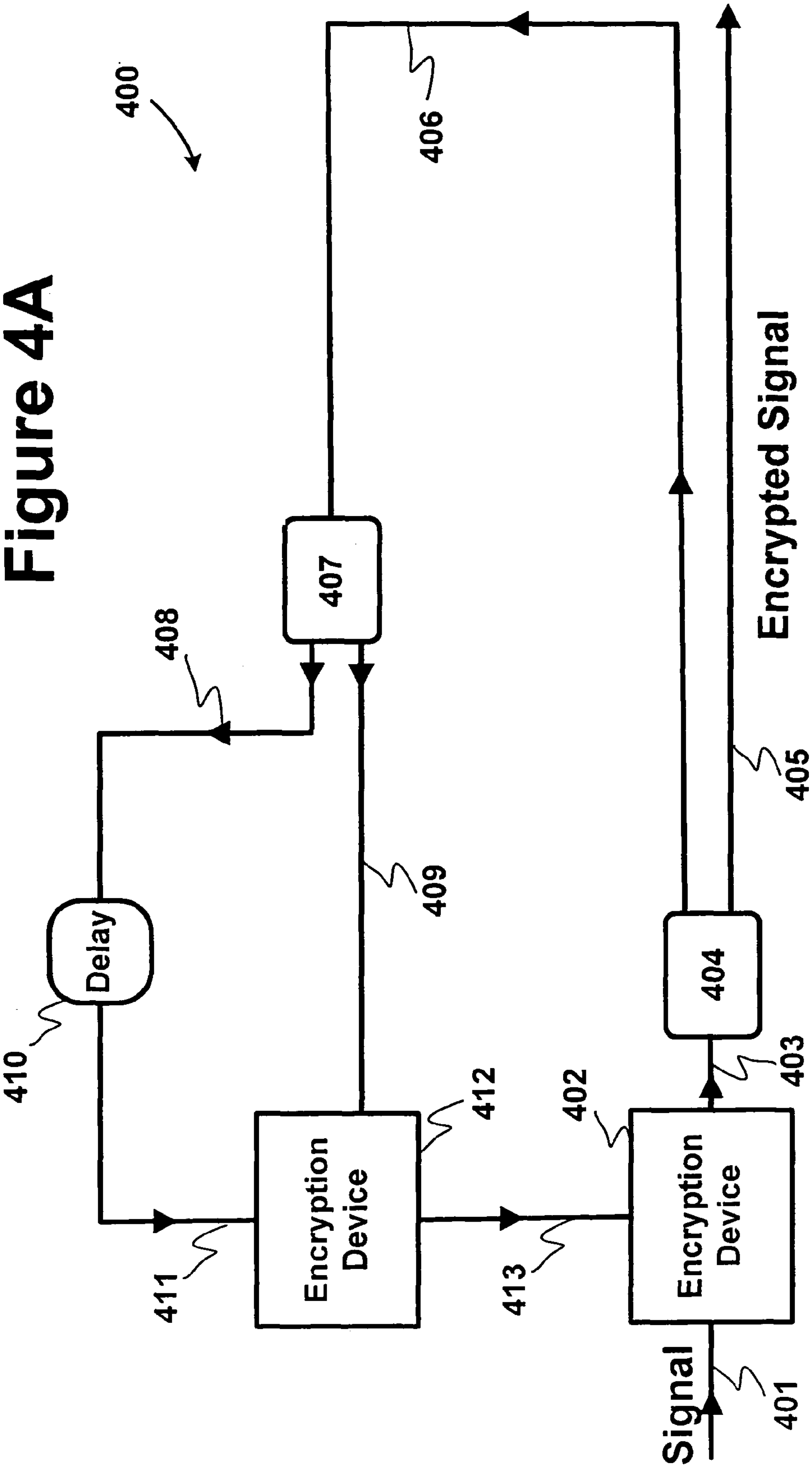
FIG. 4A shows a functional block diagram of an exemplary system for the encryption of an optical signal according to an embodiment of the present invention.

FIG. 4A shows a functional block diagram of an exemplary system for the encryption of an optical signal according to an embodiment of the present invention. The system 400 may utilize multiple encryption devices 402, 412 so as to create an even more robust optical delay than the optical delay 310 shown in FIG. 3A. In this embodiment, an optical coupler 407, an optical delay 410 and the encryption device 412 may serve as the optical delay for the encryption device 402.

The operation of the encryption apparatus 400 illustrated in FIG. 4A may be similar to that of the encryption apparatus illustrated in FIG. 3A. The encryption device 402 may be configured to receive an unencrypted optical signal 401 and may further be configured to output an optical signal that is based on the unencrypted optical signal 403. An optical coupler 404 may receive the optical signal that is based on the unencrypted optical signal 403 output by the encryption device 402, may divide the optical signal that is based on the unencrypted optical signal into multiple portions 405, 406 and may output each individual portion. One of the portions of the optical signal that is based on the unencrypted optical signal may initially be output from the encryption apparatus 400 as an unencrypted optical signal 405 and the other portion of the optical signal that is based on the unencrypted optical signal may be fed to the optical coupler 407. In one embodiment, the optical signal may be divided equally by the optical coupler 404, with only a loss in the intensity of the optical signal. However, as will be readily apparent to one of skill in the art, the unencrypted optical signal portion may be divided according to any suitable ratio. Again, it should be noted that, while the various optical components may cause some small changes to the optical signal, the binary signal (i.e. the data) will remain identical in both signals.

The second portion of the optical signal that is based on the unencrypted optical signal 406 may be received by the optical coupler 407 and divided into multiple portions 408, 409. One of these portions 408 may then be delayed using optical delay 410 and the other portion 409 may be fed to the encryption device 412. Upon receipt of the delayed optical signal 411, the encryption device 412 may encrypt the optical signal portion 409 currently being received in a manner similar to the process performed by the encryption device illustrated in FIG. 3A. The encryption may be accomplished by combining the optical signal portion 409 currently being received with the delayed optical signal portion 411. The encrypted optical signal may then be output to the encryption device 402 as a delayed optical signal 413. Upon receipt of the delayed optical signal 413, the encryption device 402 may encrypt the unencrypted optical signal 401 in a similar manner as described in FIG. 3A where the delayed optical signal 413 is an encrypted optical signal.

Figure 4B:
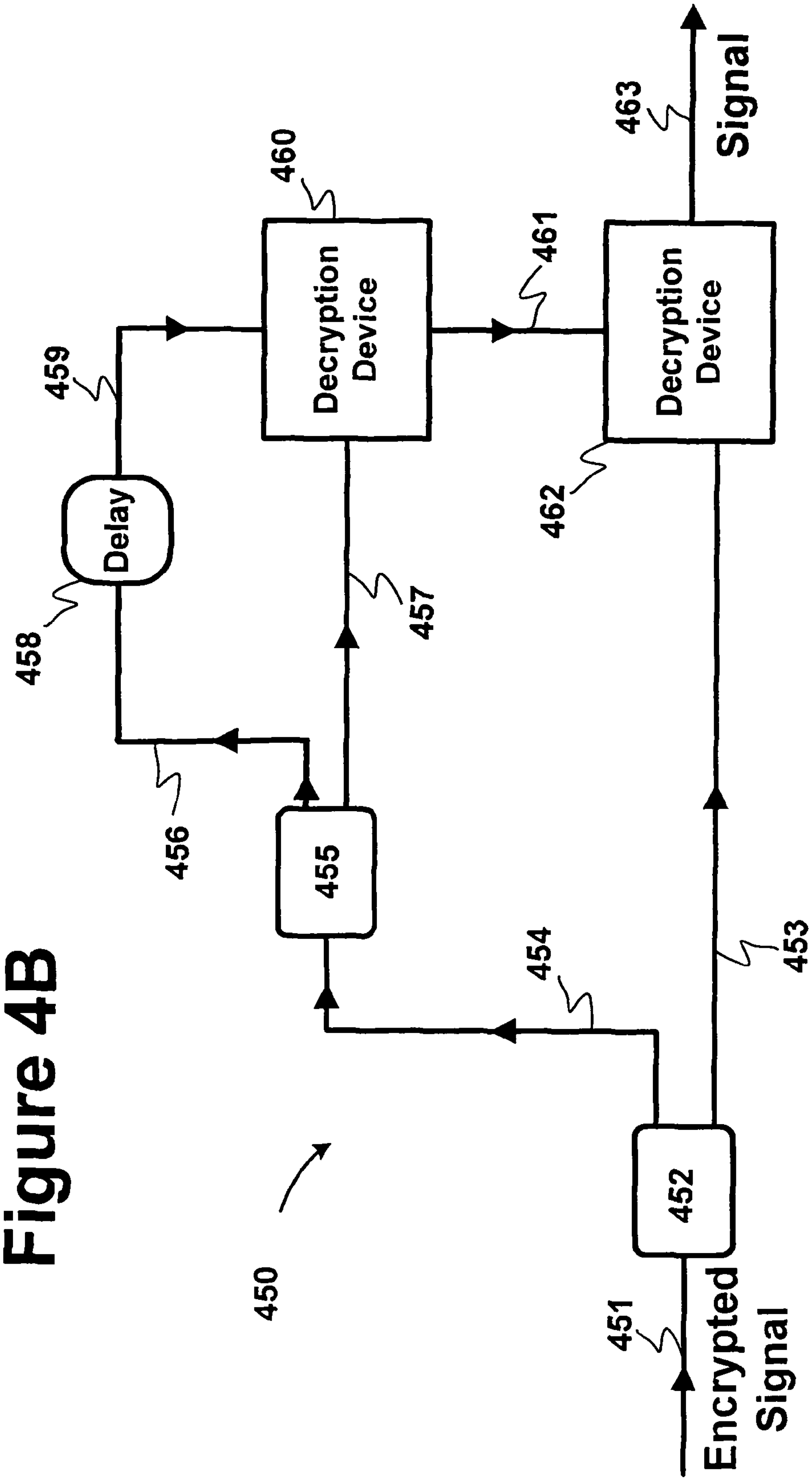
FIG. 4B shows a functional block diagram of an exemplary system for the decryption of an optical signal according to an embodiment of the present invention.

FIG. 4B shows a functional block diagram of an exemplary system for the decryption of an optical signal according to an embodiment of the present invention. FIG. 4B illustrates a system 450 that may utilize multiple decryption devices 460, 462 for the decryption of an encrypted optical signal 451. In this embodiment, an optical coupler 455, an optical delay 458 and a decryption device 460 may serve as the optical delay for the decryption device 462.

The operation of the decryption apparatus 450 illustrated in FIG. 4B is similar to that of the decryption apparatus illustrated in FIG. 3B. An encrypted optical signal 451 may be received and decrypted using a process that is the analog of the encryption process illustrated in FIG. 4A. The decryption apparatus 450 may receive an encrypted optical signal 451 that may be the same encrypted optical signal output by an encryption apparatus similar to the apparatus 400 illustrated in FIG. 4A. Once decryption is complete, the decryption apparatus may output an unencrypted optical signal 463 that may be identical to the unencrypted optical signal received by the encryption apparatus that performed the encryption of the optical signal.

During operation, an optical coupler 452 may receive the encrypted optical signal 451 and may divide the encrypted optical signal into multiple portions of the encrypted optical signal 453, 454, outputting each portion separately. The decryption device 462 may be configured to receive one of the portions of the encrypted optical signal 453 and a second optical coupler 455 may receive the other portion of the encrypted optical signal 454. In one embodiment, the optical signal may be divided equally by the optical coupler 452, with only a loss in the intensity of the optical signal. However, the encrypted optical signal portion may be divided according to any suitable ratio. Again, it should be noted that, while the various optical components may cause some small changes to the optical signal, the binary signal (i.e. the data) will remain identical in both signals.

The second portion of the encrypted optical signal 454 may then be divided into multiple portions 456, 457. One of these portions 456 may then be delayed using optical delay 458 and the other portion 457 may be fed to the decryption device 460. Upon receipt of the delayed optical signal 459, the decryption device 460 may decrypt the optical signal portion 457 currently being received in a manner similar to the process performed by the decryption device illustrated in FIG. 3B. The decryption of the encrypted optical signal may be accomplished by combining the optical signal portion 457 with the delayed optical signal portion 459. The decrypted optical signal 461 may then be output to the decryption device 462 as a delayed optical signal 461. Upon receipt of the delayed optical signal 461, the decryption device 462 may decrypt the encrypted optical signal 451 in the same manner as described with regard to FIG. 3B.

As discussed earlier, in order for an encryption apparatus according to the present invention to function with a decryption apparatus according to the present invention, the length of time of the optical delay in the encryption apparatus must be matched perfectly to the length of time of the optical delay in the decryption apparatus. With multiple encryption and decryption apparatuses, the number of apparatuses and the time delay on each end of the transmission medium must also be identical. Because, in the previously discussed embodiment with respect to FIG. 4A, the delayed optical signal portion 406 is encrypted prior to the encryption of the originally received unencrypted optical signal 401, the encryption may be more difficult to decipher. In effect, there are now two optical delays (the delay due to the optical fiber 406 and the delay due to the optical delay 410), and simply delaying the encrypted signal by the exact same time delay will not recover the data. As a result of using multiple encryption apparatuses, the number of possibilities for the unencrypted optical signal may be significantly increased. In alternative embodiments (not shown), any number of encryption and decryption devices may be added in the optical delays or the length of the optical delays may be altered, thereby further increasing the number of possibilities for the unencrypted signal.

In another embodiment (not shown), the optical delays may be made dynamic with scheduled changes in length of time. This may be accomplished by increasing or decreasing the length of an optical fiber, using optical switches to select different optical delays or other various means which will be readily apparent to one of skill in the art. These changes may be slow in comparison to the data rate but nonetheless must be performed at both the transmitter and receiver ends. In addition, the scheduled changes in the decryption apparatus would have to account for the time it takes for the data to traverse the transmission medium. This may be accomplished by the insertion of tones or other markers into the encrypted optical signal. In any of the above-discussed embodiments for the optical delay, anyone wanting to intercept the transmitted signal must know the exact system used for encryption in order to decrypt the encrypted optical signal.

As discussed above with reference to FIGS. 3A and 3B, an encryption device and a decryption device according to the present invention may be configured to receive an optical signal and a delayed optical signal that is based on the optical signal. The two optical signals received by the respective devices may be combined with each other so as to create an encrypted (in the encryption apparatus) or a decrypted (in the decryption apparatus) optical signal. In the present invention, the encryption or decryption of the optical signal may be achieved by the combination of a portion of each optical signal (the optical signal and a delayed optical signal that is based on the optical signal) using Nonlinear Optical Loop Mirrors.

Figure 5:
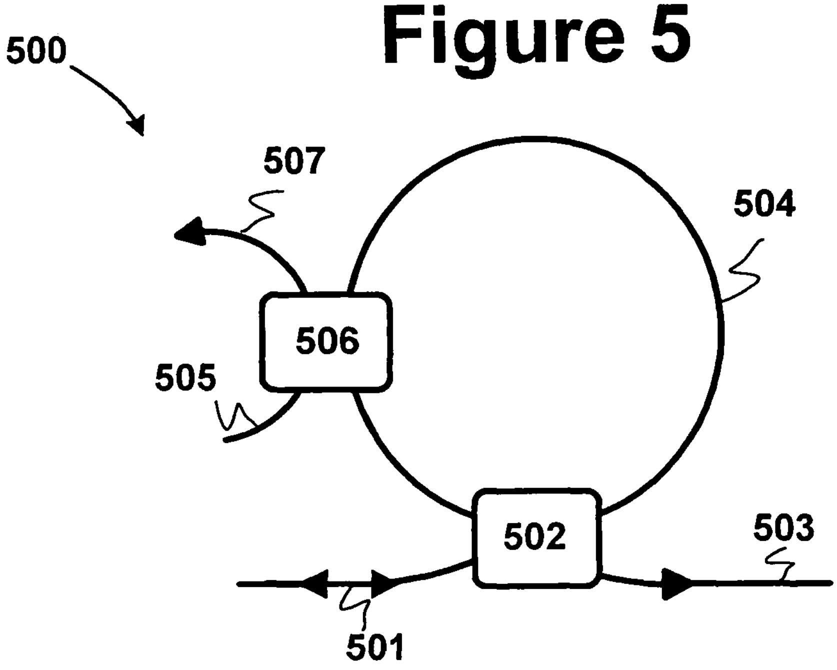
FIG. 5 shows a functional block diagram illustrating a Nonlinear Optical Loop Mirror (NOLM) utilized in various embodiments of the present invention.

FIG. 5 shows a functional block diagram illustrating a Nonlinear Optical Loop Mirror (NOLM) 500 utilized in various embodiments of the present invention. The NOLM technology may be based upon the nonlinear effect of cross-phase modulation that occurs in optical materials and utilizes a Sagnac interferometer that converts a phase signal to an intensity signal. The NOLM may receive an optical signal and may either reflect or transmit each bit in the optical signal.

A Sagnac interferometer may be comprised of a loop of optical fiber 504 connected to a coupler or splitter 502. In one embodiment, optical fiber 504 may be a highly nonlinear optical fiber, such as band-gap optical fiber, so as to reduce fiber length and environmental effects on the optical signals traveling within. However, the loop of optical fiber 504 may be any conventional optical fiber.

In operation, an optical signal 501 may be received by the optical coupler or splitter 502 and divided into two counter-propagating waves in the optical fiber loop 504. These waves may travel the exact same distance and recombine at the optical coupler or splitter 502. If the optical coupler is balanced, i.e. 50% of the light is launched in each direction of the loop, it can be shown that the interferometer reflects the entire signal back out the same path 501 that it used to enter the interferometer, hence the term "mirror." To unbalance the loop, an optical control signal 505 may be injected into the fiber optic loop 504 via a second coupler or splitter 506. The portion of the optical signal 507 that is not injected into the fiber may be terminated in any conventional manner. In this arrangement, the optical control signal 505 may travel in only one direction. Through the nonlinear effect of cross-phase modulation, the optical signal wave co-propagating with the optical control signal wave may experience a phase shift different from that of the optical signal wave counter-propagating with the optical control signal wave. By adjusting the loop length and the intensity of the control wave, a phase shift may be imparted to the co-propagating optical signal wave. Under these conditions, the optical signal wave may no longer be reflected but may be entirely transmitted by the NOLM and may be terminated in any conventional manner.

In this fashion, the NOLM 500 may act like an optically controlled logical AND gate. If the optical signal pulse 501 overlaps an optical control pulse 505 in the fiber optic loop, it may be output 503 by the NOLM 500. Otherwise, the optical signal pulse 501 may be reflected back toward the optical signal source. To prevent the optical control signal 505 from corrupting the data in the optical signal 501, it may be orthogonally polarized to the data and eliminated at the output through a polarization sensitive splitter (not shown). Additionally, the optical signal 505 received at the control port may need to be optically amplified to enhance the nonlinear effect of cross phase modulation (not shown).

NOLMs may be built with either long lengths of highly nonlinear fiber, such as dispersion-compensating fiber, or with a short length of fiber in combination with a semiconductor optical amplifier. Additionally, as discussed above, NOLMs may utilize band-gap optical fiber to reduce the fiber length and thus reduce the environmental effects on the optical signal. If the NOLM is built with dispersion-compensating fiber, special precautions may need to be taken to prevent environmental effects from unbalancing the loop. If a short length of conventional optical fiber and a semiconductor optical amplifier are used, the data rate may be limited to 20 Gb/s or less because of the finite carrier recovery time in the semiconductor. The design may depend on the data rate required by the application. For the purpose of simplicity, the remaining discussions will assume the use of dispersion-compensating optical fiber or band-gap optical fiber for optical fiber 504. However, one of skill in the art will realize that a short length of conventional optical fiber with a semiconductor optical amplifier may be substituted in applications that do not require a high data rate.

Figure 6:
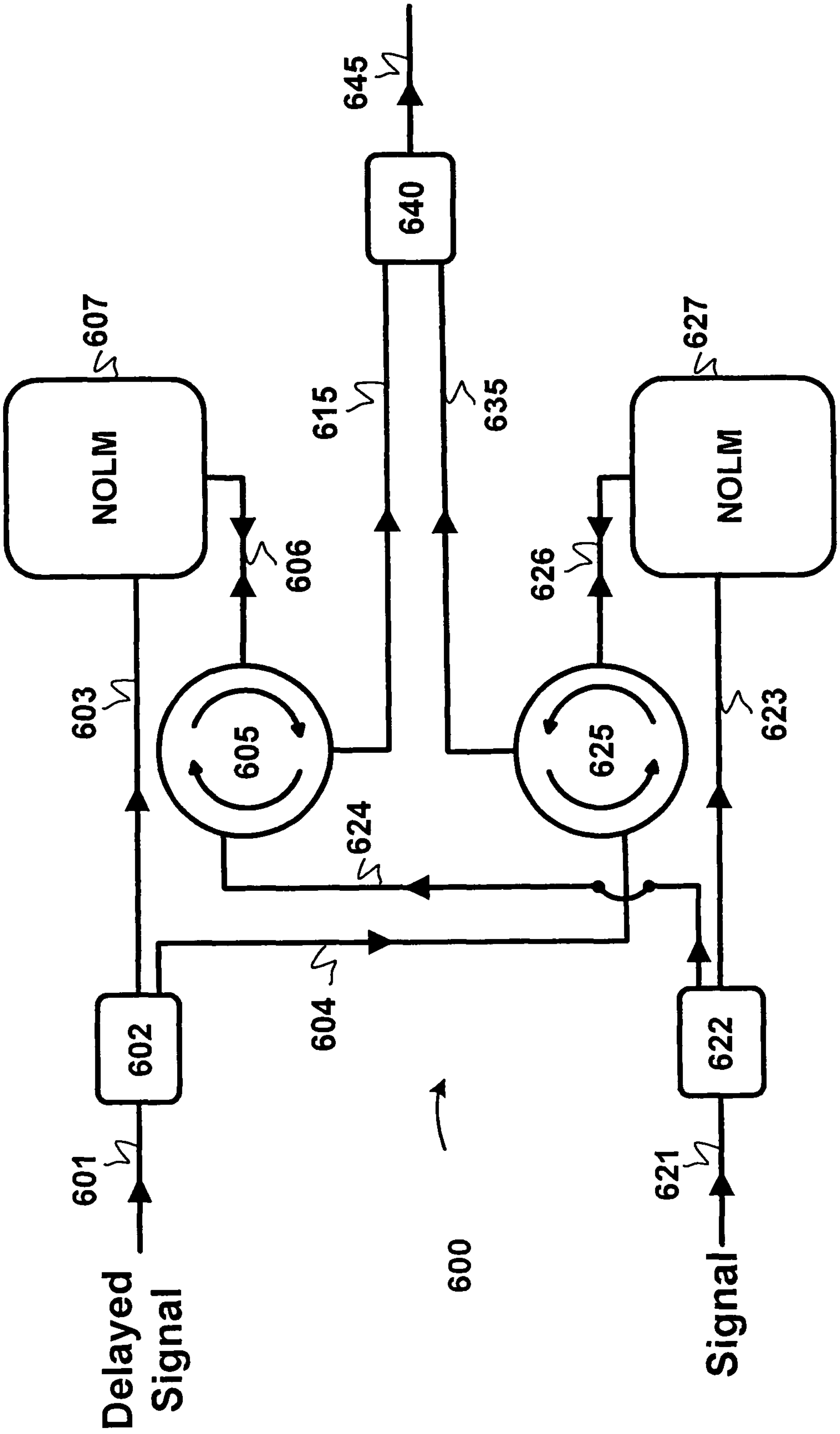
FIG. 6 shows a functional block diagram illustrating the combination of optical signals in an encryption device and decryption device according to an exemplary embodiment of the present invention.

FIG. 6 shows a functional block diagram illustrating the combination of optical signals in an encryption device and decryption device according to an exemplary embodiment of the present invention. In one embodiment, the device 600 may combine optical signals using multiple NOLMs 607, 627. In other embodiments, any conventional interferometer may be used. With conventional interferometers, it is important to note that the two paths that the optical signals follow must be identical. Additionally, the environment must be well controlled, as the two optical signals do not propagate in the same optical fiber as in the Sagnac interferometer.

The device 600 shown in FIG. 6 illustrates the combination of two optical signals within each of the encryption and decryption devices. Each encryption and decryption device in the present invention combines optical signals in a similar manner. Therefore, the discussion below with reference to FIG. 6 will refer only to a "device." However, one of skill in the art will realize that the device may be used in either an encryption or a decryption apparatus.

The encryption and decryption operation of the present invention may be based on an optically controlled logical exclusive OR (XOR) operation where 0Θ1=1, 1Θ0=1, 1Θ1=0 and 0Θ0=0 (where Θ is the XOR operator). If a signal bit stream is XORed with a key bit stream, the result is a ciphered bit stream. To recover the original bit stream, a second XOR is performed using the same key. An example of this encryption and decryption process is shown in Table 1.

TABLE 1

| Encryption | Decryption |
|---|---|
| Signal: 110001011000 | Cipher: 101010000011 |
| Key: 011011011011 | Key: 011011011011 |
| Cipher: 101010000011 | Signal: 110001011000 |

The encryption and decryption operations in the present invention may use an XOR operation with an NOLM. This may be accomplished by gaining access to optical signals that may be reflected by the NOLM, as discussed above with reference to FIG. 5. To obtain access, one embodiment of the present invention uses an optical circulator. The optical circulator may be a three-port device where the first port transmits only to the second port and the second port transmits only to the third port. Two optical circulators 605 and 625 are shown in FIG. 6. If a circulator is inserted at the input 606, 626 of an NOLM 607, 627, the circulator 605, 625 may efficiently redirect all of the light reflected by the NOLM to an auxiliary output 615, 635. Therefore, all signal bits that do not co-propagate with a control bit may be reflected and directed by the circulator to an auxiliary output. As an alternative to using optical circulators, the present invention may utilize an optical coupler, a grating-based device, an optical bus or various other types of optical means for routing optical signals.

The design of each encryption and decryption device may be composed of two NOLMs 607, 627 connected by two optical couplers 602, 622 at their optical control signal ports 603, 623 (shown as 505 in FIG. 5) and a single optical coupler 640 at their optical signal ports 615, 635 (shown as 501 in FIG. 5). Two synchronized optical signals, a delayed optical signal 601 and an optical signal 621, may each enter one of the two optical couplers 602, 622. Each optical signal may be split into two portions by the optical couplers 602, 622; one of the portions of each optical signal 603, 623 may directed to the control ports of the NOLMs and one of the portions of each optical signal 604, 624 may be directed to one of the optical circulators 605, 625. The optical circulators 605, 625 may then direct the optical signal portions 604, 624 to the input ports 606, 626 of the NOLMs 607, 627. As discussed above, any signals reflected by the NOLMs 607, 627 may be received by the circulators 605, 625 and directed to auxiliary outputs 615, 635. The auxiliary outputs 615, 635 may be combined using an optical coupler 640 and a single, encrypted optical signal 645 may be output.

The device shown in FIG. 6 may utilize the XOR principles in the following manner. If the corresponding bits of each of the delayed optical signal 601 and the optical signal 621 are "1," both NOLMs 607, 627 may see a Π phase shift and the bit may be transmitted and not reflected (due to constructive interference principles as discussed with reference to FIG. 5), with no signal being received at the auxiliary outputs. Therefore, the output of both auxiliary outputs may be "0" and the encrypted optical signal bit output by the optical coupler 640 may be a "0." If the corresponding bits of each of the delayed optical signal 601 and the optical signal 621 are "0," nothing may enter either NOLM 607, 627 and, thus, the encrypted optical signal bit output by the optical coupler 640 may also be a "0." On the other hand, if either, but not both, of the corresponding bits of the delayed optical signal 601 and the optical signal 621 are a "1," one of the NOLMs 607, 627 may reflect an optical signal (due to destructive interference principles as discussed with reference to FIG. 5) and one of the NOLMs 607, 627 may transmit an optical signal. Thus, one of the auxiliary outputs 615, 635 may be a "0" and one of the auxiliary outputs 615, 635 may be a "1," resulting in a "1" emerging as the encrypted optical signal bit output by the optical coupler 640. Thus, by combining the delayed optical signal 601, 621 using two NOLMs 607, 627, an all-optical XOR operation for encryption and decryption may be performed.

The process of all-optical encryption and decryption using the encryption and decryption devices described with reference to FIG. 6 within the encryption and decryption apparatuses described with reference to FIGS. 3A and 3B may operate in the following manner. An unencrypted optical signal 305 containing individual bits may enter an encryption device 306 and a finite number of bits may pass through without being encrypted. The number of bits that pass through is a function of the total length of the optical delay in the encryption or decryption apparatus. The output bit stream 307 may be divided by an optical coupler 308 into two portions of an optical signal that is based on the unencrypted optical signal 309, 315. One portion 315 of the bits that passes through unencrypted may be transmitted. The other portion 309 may be routed to an optical delay 310 and the delayed optical signal bits 311 may then be received at the control port of the encryption device (which, in this embodiment, is a NOLM). Once the delayed optical signal portion reaches the control port, the optical signal may become encrypted due to the XOR operation within the NOLM and may remain encrypted for the entire length of the optical bit stream. In this manner, the unencrypted optical signal bits currently being received may be encrypted, after a finite delay, using optical signal bits that previously passed through the device.

The all-optical decryption process may be performed using the reverse process. An optical coupler 370 may divide a received encrypted optical signal 365 and route a portion of the encrypted optical signal 371 to a decryption device 372 and a portion of the encrypted optical signal 373 to an optical delay 374. A finite number of bits of the encrypted optical signal may be initially pass through the decryption device unaltered due to the delay of the second portion of the encrypted optical signal. Once the delayed optical signal portion reaches the control port of the decryption device (which, in this embodiment, is a NOLM), the encrypted optical signal may be decrypted using the same process used for the encryption. If the optical delay 310 in the encryption apparatus 300 is identical to the optical delay 374 in the decryption apparatus 350, the decrypted optical signal 376 will be identical to the optical signal 305 originally received by the encryption apparatus. As noted above, since the unencrypted optical signal bit stream 305 may not become encrypted until a portion of the optical signal reaches the control port of the encryption device 306, a random header may be added to the unencrypted optical signal bit stream so that the entire unencrypted optical signal is encrypted and only the random header passes through the apparatus unencrypted. Because the optical signal bits first received by the decryption apparatus may pass through unaltered, the random header will appear at the beginning of the optical signal output by the decryption apparatus and all of the encrypted data will be decrypted.

FIG. 7 shows the conceptual encryption and decryption of a signal according to the exemplary embodiment of the present invention shown in FIG. 6. An "Unencrypted Signal" which may be received by an encryption device is shown. Assuming that the length of the optical delay corresponds to the amount of time it takes for three bits to pass through the optical delay in the encryption apparatus, the first three bits of the "Unencrypted Signal" may be a random header corresponding to the length of the delay. If the length of the optical delay were longer, the length of the random header would need to be adjusted so as to correspond to the delay. In the example shown in FIG. 7, it can be seen that the first three bits of the "Encrypted Signal" are identical to the same three bits of the "Unencrypted Signal." When the first three bits of the "Unencrypted Signal" pass through the optical delay and are received by the encryption device, they may then become the first three bits of the "Delayed Signal" and may be used for encrypting the second three bits of the "Unencrypted Signal." These three encrypted bits may then be transmitted as the second three bits in the "Encrypted Signal."

It is important to remember that, during encryption, the "Encrypted Signal" may be divided in the encryption apparatus prior to being transmitted and a portion of the divided signal may constantly be fed through an optical delay and into the encryption device as a control signal. Therefore, prior to the transmission of the second three bits of the "Encrypted Signal," the signal may be divided and a portion may be fed through the optical delay to appear as the second three bits of the "Delayed Signal." These bits may then be used for encrypting the third three bits of the "Unencrypted Signal." This process may continue until no bits remain in the "Unencrypted Signal" received by the encryption apparatus.

As noted earlier, the decryption process operates in the reverse process of the encryption process. The decryption apparatus may receive the "Encrypted Signal" which may be divided into two portions. One portion may be delayed by the same number of bits as the delay in the encryption process and may be received by the decryption device as the control signal (shown in FIG. 7 as the "Delayed Encr. Signal"). The other portion of the "Encrypted Signal" may be fed directly to the encryption device. As in the encryption process, the first three bits may be output by the decryption device unaltered as the delayed encrypted optical signal portion has not yet reached the control port. Once the "Delayed Encr. Signal" reaches the decryption device, it may be used to decrypt the "Encrypted Signal," beginning with the second three bits of the "Encrypted Signal." Finally, it should be noted that the decryption apparatus does not require that the signal loop back on itself so the "Delayed Encr. Signal" may simply be a shifted version of the "Encrypted Signal" throughout the decryption process.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. A method for transmitting an optical signal, the method comprising:
- receiving a first portion of an unencrypted optical signal containing data at a first time;
- splitting the first portion of the unencrypted optical signal containing data into a first unencrypted optical signal and a second unencrypted optical signal, the first unencrypted optical signal being identical to the second unencrypted optical signal;
- time-delaying the second unencrypted optical signal to generate a time-delayed second unencrypted optical signal, wherein the first unencrypted optical signal remains identical in content to the time-delayed second unencrypted optical signal but is out of phase with the time-delayed second unencrypted optical signal;
- continuing to receive a second portion of the unencrypted optical signal at a second time after the first time such that the second portion is received after the first portion; and
- generating an encrypted optical signal at an encryption device by feeding the time-delayed second unencrypted optical signal back to the encryption device and interfering the second portion of the unencrypted optical signal with the time-delayed second unencrypted optical signal.

2. The method of claim 1, further comprising the steps of:
- receiving the encrypted optical signal;
- time-delaying the encrypted optical signal; and
- decrypting the encrypted optical signal by interfering at least a portion of the encrypted optical signal with a time-delayed optical signal that is based on the encrypted optical signal.

3. The method of claim 2, wherein the step of decrypting the encrypted Optical signal further comprises outputting a decrypted optical signal identical to the unencrypted optical signal.

4. The method of claim 3, wherein the steps of time-delaying the second unencrypted optical signal and time-delaying the encrypted optical signal are performed for the same length of time.

5. The method of claim 2, wherein the step of decrypting the optical signal comprises:

receiving both the encrypted optical signal and a time-delayed optical signal that is based on the encrypted optical signal;

dividing the encrypted optical signal into multiple portions;

dividing the time-delayed optical signal that is based on the encrypted optical signal into multiple portions;

combining, at each of a first and second optical gate, one of the portions of the encrypted optical signal and one of the portions of the time-delayed optical signal that is based on the encrypted optical signal;

outputting, by each of the first and second optical gates, a result of the combining of one of portions of the encrypted optical signal and one of the portions of the time-delayed optical signal that is based on the encrypted optical signal;

combining the output of each of the first and second optical gates; and outputting a decrypted optical signal.

6. The method of claim 5, wherein the decrypted optical signal is identical to the unencrypted optical signal.

7. The method of claim 5, wherein the step of dividing the time-delayed optical signal that is based on the encrypted optical signal into multiple portions comprises dividing the time-delayed optical signal that is based on the encrypted optical signal into two identical portions.

8. The method of claim 5, wherein the step of dividing the encrypted optical signal into multiple portions comprises dividing the encrypted optical signal into two identical portions.

9. A method for processing an optical signal, the method comprising:

receiving a first portion of an unencrypted optical signal containing data at a first time;

coupling the first portion of the unencrypted optical signal to an optical time-delay and time-delaying the first portion of the unencrypted optical signal to generate a time-delayed optical signal based on the first portion of the unencrypted optical signal;

receiving a second portion of the unencrypted optical signal at a second time occurring after the first time;

generating an encrypted optical signal by interfering;

encrypting the second portion of the unencrypted optical signal at an encryption device by feeding the time-delayed second unencrypted optical signal back to the encryption device and interfering the second portion of the unencrypted optical signal with the time-delayed optical signal;

wherein the step of encrypting the second portion of the unencrypted optical signal comprises:

receiving both the second portion of the unencrypted optical signal and the time-delayed optical signal;

dividing the second portion of the unencrypted optical signal into multiple portions;

dividing the time-delayed optical signal into multiple portions;

combining, at each of a first and second optical gate, one of the portions of the second portion of the unencrypted optical signal and one of the portions of the time-delayed optical signal;

outputting, by each of the first and second optical gates, a result of the combining of one of the portions of the second portion of the unencrypted optical signal and one of the portions of the time-delayed optical signal;

combining the output of each of the first and second optical gates; and outputting an optical signal that is based on the unencrypted optical signal.

10. The method of claim 9, wherein the step of dividing the unencrypted optical signal into multiple portions comprises dividing the unencrypted optical signal into two identical portions.

11. The method of claim 9, wherein the step of dividing the time-delayed optical signal that is based on the unencrypted optical signal into multiple portions comprises dividing the time-delayed optical signal that is based on the unencrypted optical signal into two identical portions.

12. An apparatus for optical encryption, the apparatus comprising:

an optical delay that generates a time-delayed optical signal based on a previously received portion of an unencrypted data optical signal;

an optical encryption device having a first optical data input, a second optical data input and an optical output, the first optical data input being configured to receive a portion of the unencrypted data optical signal that is currently being received, the second optical data input being configured to receive, from said optical delay, the time-delayed optical signal, and the optical output being configured to output an encrypted optical signal that is generated by the optical encryption device based on the portion of the unencrypted optical data signal that is currently being received and the time-delayed optical signal; and an optical coupler having an optical input, a first optical output being coupled to the optical delay via a feedback path, and a second optical output, the optical input being configured to receive the encrypted optical signal that is generated by the encryption device, the first optical output being configured to output a first portion of the encrypted optical signal to said optical delay via the feedback path, and the second optical output being configured to output a second portion of the encrypted optical signal as output encrypted optical signal.

13. The apparatus of claim 12, wherein said optical delay comprises at least one of a fiber optic loop, a light pipe and mirrors.

14. The apparatus of claim 12, said optical encryption device being a first optical encryption device, wherein said optical delay comprises a second optical encryption device.

15. The apparatus of claim 12, wherein binary content of the first portion of the encrypted optical signal is identical to binary content of the second portion of the unencrypted optical signal.

16. The apparatus of claim 12, wherein said optical encryption device comprises:

a first optical gate, the first optical gate being configured to receive both a portion of the unencrypted optical signal and a portion of the time-delayed optical signal that is based on the unencrypted optical signal and further configured to output an optical signal that is based on both the received portion of the unencrypted optical signal and the received portion of the time-delayed optical signal that is based on the unencrypted optical signal;

a second optical gate, the second optical gate being configured to receive both a portion of the unencrypted optical signal and a portion of the time-delayed optical signal that is based on the unencrypted optical signal and further configured to output an optical signal that is based on both the received portion of the unencrypted optical signal and the received portion of the time-delayed optical signal that is based on the unencrypted optical signal; and an optical coupler having a first optical input, a second optical input and an optical output, the first optical input being configured to receive the output of said first optical gate, the second optical input being configured to receive the output of said second optical gate and the optical output being configured to output the optical signal that is based on the unencrypted optical signal.

17. The apparatus of claim 16, wherein at least one of the optical signals received by said first optical gate and said second optical gate are amplified using an optical amplifier.

18. The apparatus of claim 12, wherein the time-delayed optical signal is a time-delayed version of the unencrypted optical signal.

19. The apparatus of claim 18, wherein the optical output being configured to output an optical signal that is at least a combination of the unencrypted signal and the time-delayed optical signal.

20. The apparatus of claim 12, wherein the optical output is configured to output an optical signal that is at least a combination of the unencrypted signal and the time-delayed optical signal.

21. An apparatus for optical decryption, the apparatus comprising:

an optical coupler having an optical input, a first optical output and a second optical output, the optical input being configured to receive an encrypted optical signal at a first time, the first optical output being configured to output a first portion of the encrypted optical signal and the second output being configured to output a second portion of the encrypted optical signal;

an optical delay configured to receive the first portion of the encrypted optical signal and to generate a time-delayed optical signal that is based on the first portion of the encrypted optical signal; and an optical decryption device having a first optical input, a second optical input and an optical output, the first optical input being configured to receive the second portion of the encrypted optical signal, the second optical input being configured to receive, from said optical delay, the time-delayed optical signal that is fedforward from the optical delay, and the optical output being configured to generate a decrypted optical signal based on the time-delayed optical signal that was fedforward from the optical delay and a portion of the encrypted optical signal that is received at a second time after the first time.

22. The apparatus of claim 21, wherein said optical delay comprises at least one of a fiber optic loop, a light pipe and mirrors.

23. The apparatus of claim 21, said optical decryption device being a first optical decryption device, wherein said optical delay comprises a second optical decryption device.

24. The apparatus of claim 21, wherein the first portion of the encrypted optical signal is identical to the second portion of the encrypted optical signal.

25. The apparatus of claim 21, wherein said optical decryption device comprises:

a first optical gate, the first optical gate being configured to receive a portion of the encrypted optical signal and a portion of the time-delayed encrypted optical signal and further configured to output an optical signal that is based on both the received portion of the encrypted optical signal and the received portion of the time-delayed encrypted optical signal;

a second optical gate, the second optical gate being configured to receive a portion of the encrypted optical signal and a portion of the time-delayed encrypted optical signal and further configured to output an optical signal that is based on both the received portion of the encrypted optical signal and the received portion of the time-delayed encrypted optical signal; and an optical coupler having a first optical input, a second optical input and an optical output, the first optical input being configured to receive the output of said first optical gate, the second optical input being configured to receive the output of said second optical gate and the optical output being configured to output the decrypted optical signal.

26. The apparatus of claim 25, wherein at least one of the optical signals received by said first optical gate and said second optical gate are amplified using an optical amplifier.

27. The apparatus of claim 21, wherein the first optical input is a data input, the second optical input is a data input, and the encrypted optical signal is an encrypted optical data signal.

28. An optical transmission system, the system comprising:

a first optical delay;

an encryption device having a first optical input, a second optical input and an optical output, the first optical input being configured to receive an unencrypted optical data signal, the second optical data input being configured to receive, from said first optical delay, a delayed optical signal that is based on the unencrypted optical signal and the optical output being configured to output an optical signal that is based on the unencrypted optical data signal;

a first optical coupler having an optical input, a first optical output and a second optical output, the optical input being configured to receive the optical signal that is based on the unencrypted optical data signal, the first optical output being configured to output a first portion of the optical signal that is based on the unencrypted optical data signal to said first optical delay, and the second optical output being configured to transmit a second portion of the optical signal that is based on the unencrypted optical data signal as an encrypted optical signal;

a transmission line having at least a first end and a second end, the transmission line being configured to receive the encrypted optical signal from said first optical coupler;

a second optical coupler having an optical input, a first optical output and a second optical output, the optical input being configured to receive the encrypted optical signal from said transmission line, the first optical output being configured to output a first portion of the encrypted optical signal and the second output being configured to output a second portion of the encrypted optical signal;

a second optical delay configured to receive the first portion of the encrypted optical signal; and an optical decryption device having a first optical input, a second optical input and an optical output, the first optical input being configured to receive the second portion of the encrypted optical signal, the second optical input being configured to receive, from said second optical delay, a delayed optical signal that is based on the encrypted optical signal and the optical output being configured to output a decrypted optical signal.

29. The system of claim 28, wherein the unencrypted optical signal is identical to the decrypted optical signal.

30. The system of claim 28, wherein the time delay of said first optical delay is identical to the time delay of said second optical delay.

31. The system of claim 28, wherein said transmission line is used for telecommunications.

32. The system of claim 28, wherein said transmission line is configured to transmit data bi-directionally.

33. The system of claim 32, further comprising:

a first optical switch optically coupled to the first end of said transmission line and said first optical coupler; and a second optical switch optically coupled to the second end of said transmission line and said second optical coupler.

34. The system of claim 32, further comprising an optical circulator optically coupled to the first end of said transmission line, the optical circulator being configured to receive an encrypted optical signal from said first optical coupler, transmit the encrypted optical signal using said transmission line, receive an optical signal from said transmission line and output a received encrypted optical signal to a third optical coupler.

35. The system of claim 32, further comprising an optical circulator optically coupled to the second end of said transmission line, the optical circulator being configured to receive an encrypted optical signal from said transmission line, output the encrypted optical signal to said second optical coupler, receive an optical signal from a third optical coupler and transmit a received encrypted optical signal using said transmission line.

36. The system of claim 28, wherein the time-delayed optical signal is a time-delayed version of the unencrypted optical signal.

37. The system of claim 36, wherein the optical output is configured to output an optical signal that is at least a combination of the unencrypted signal and the time-delayed optical signal.

38. The system of claim 28, wherein the optical output is configured to output an optical signal that is at least a combination of the unencrypted signal and the time-delayed optical signal.

39. An apparatus for optical encryption, the apparatus comprising:

an optical delay configured to generate a time-delayed version of an unencrypted data optical signal that was received at a first time;

an optical encryption device coupled to the optical delay via a feedback path, comprising:

a first optical data input configured to receive the unencrypted data optical signal at the first time;

a second optical data input configured to receive, from said optical delay, the time-delayed version of the unencrypted data optical signal that was received at the first time;

an optical output being configured to output an encrypted optical signal that is generated by the optical encryption device based on the unencrypted data optical signal that is received at a second time and the time-delayed version of the unencrypted data optical signal that is fedback to the optical encryption device, wherein the second time occurs after the first time; and an optical coupler coupled between the encryption device and the optical delay, comprising:

an optical input configured to receive the encrypted optical signal;

a first optical output configured to output a first portion of the encrypted optical signal;

a second optical output configured to output a second portion of the encrypted optical signal as an encrypted optical signal.

* * * * *